United States Patent [19]

Nakamura et al.

[11] Patent Number: 5,448,055
[45] Date of Patent: Sep. 5, 1995

[54] DIRECT-CONTACT TYPE IMAGE SENSOR USING OPTICAL FIBER ARRAY WITH LIGHT ABSORBING CLADDING

[75] Inventors: Tetsuro Nakamura, Takarazuka; Eiji Kawamoto, Kadoma; Shinji Fujiwara, Kobe, all of Japan

[73] Assignee: Matsushita Electric Industrial Co., Ltd., Osaka, Japan

[21] Appl. No.: 161,123

[22] Filed: Dec. 2, 1993

[30] Foreign Application Priority Data

Dec. 3, 1992 [JP] Japan .................... 4-323906
Dec. 8, 1992 [JP] Japan .................... 4-327754

[51] Int. Cl.⁶ .............................. H01J 40/14
[52] U.S. Cl. ................... 250/208.1; 358/484
[58] Field of Search ............. 250/208.1, 227.2; 358/482, 483, 484; 385/116, 117, 118

[56] References Cited

U.S. PATENT DOCUMENTS

| | | | |
|---|---|---|---|
| 5,032,718 | 7/1991 | Murakami | 250/227.20 |
| 5,038,027 | 8/1991 | Ioka | 250/208.1 |
| 5,052,776 | 10/1991 | Fukushima et al. | 385/120 |
| 5,065,006 | 11/1991 | Nakamura et al. | 250/208.1 |
| 5,081,347 | 1/1992 | Matsumoto | 250/211 J |
| 5,138,145 | 8/1992 | Nakamura et al. | 250/208.1 |
| 5,187,596 | 2/1993 | Hwang | 358/484 |
| 5,266,828 | 11/1993 | Nakamura et al. | 257/432 |
| 5,319,731 | 6/1994 | Eastman | 385/115 |

Primary Examiner—David C. Nelms
Assistant Examiner—Steven L. Nichols
Attorney, Agent, or Firm—Ratner & Prestia

[57] ABSTRACT

The present invention provides a direct-contact type image sensor device in which an image sensor chip having electrodes and a photosensitive element array is mounted on an optical fiber array plate by a flip-chip-bonding method. The optical fiber array plate includes a first opaque substrate, a second opaque substrate, an optical fiber array formed by arranging a plurality of optical fibers, and a transparent member disposed in contact with a side face of the optical fiber array, the optical fiber array and the transparent member being interposed between the first and second opaque substrates. Each of the plurality of optical fibers includes a center core, a clad provided on an outer surface of the core, and a light absorbing layer provided on an outer surface of the clad. The image sensor chip is provided in such a way that the photosensitive element array is disposed along an upper end of the optical fiber array and in a portion of the optical fiber array plate except the transparent member, the transparent member forming a slit for transmitting light.

52 Claims, 7 Drawing Sheets

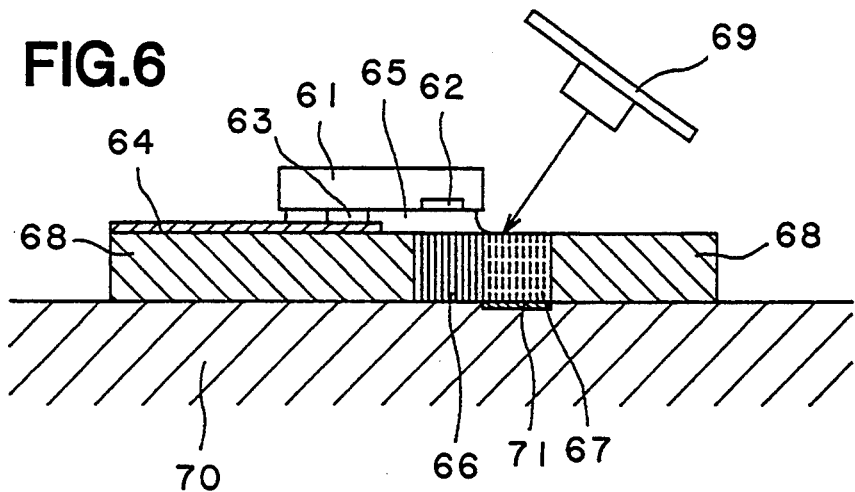
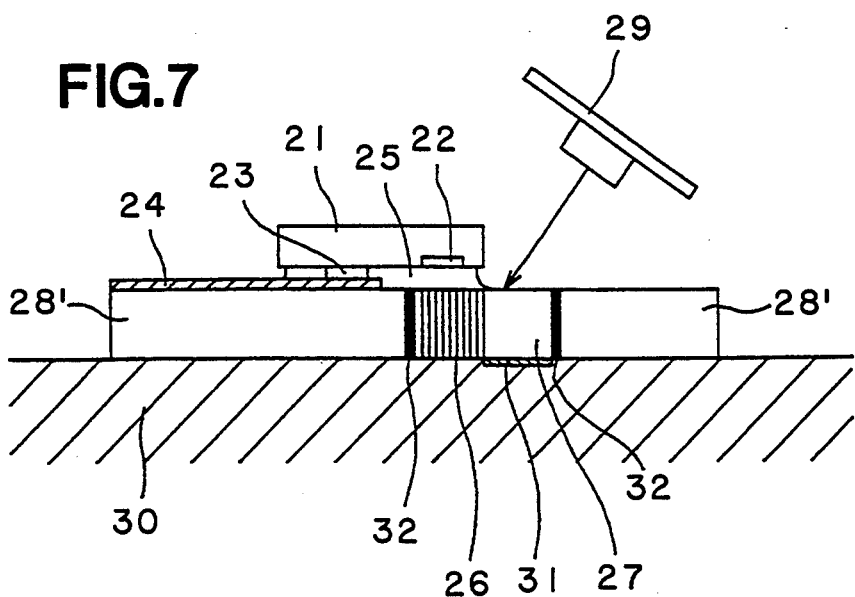
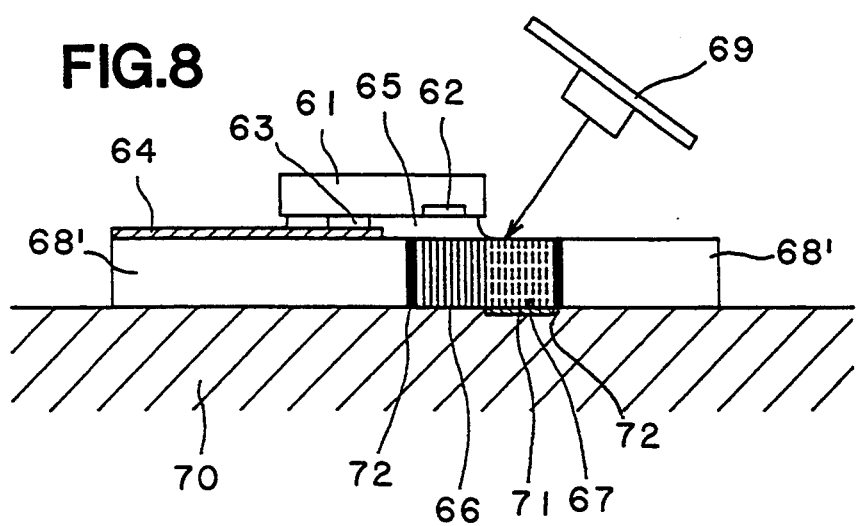

DIRECT-CONTACT TYPE IMAGE SENSOR USING OPTICAL FIBER ARRAY WITH LIGHT ABSORBING CLADDING

BACKGROUND OF THE INVENTION

1. Field of the Invention

The present invention relates to an image sensor device for converting an optical image into an electric signal, and more particularly to a direct-contact type image sensor device and an image sensor unit in which the image sensor device is used.

2. Description of the Related Art

FIGS. 9A and 9B show a conventional direct-contact type image sensor device in which an optical fiber array is used. FIG. 9A shows a front cross-section of the device, while FIG. 9B shows a side cross-section thereof. An image sensor chip 81 is mounted on a substrate 87 having an optical fiber array 83 in such a way that a photosensitive element array 82 is disposed on one end of the optical fiber array 83. Optical image information of a document original 90 disposed so as to be in direct contact with the other end of the optical fiber array 83 is led into the photosensitive element array 82 so as to be converted into an image signal.

However, an image sensor of the above configuration has a problem of poor performance in reading images. The problem is typically caused by the fact that light emitted from light source 85 and light reflected from the document original 90 may have cross-talk among optical fibers constituting the optical fiber array 83, and that there may be redundant optical information due to an unnecessary portion of light emitted from the light source 85 and an unnecessary portion of reflected light.

U.S. Pat. No. 5,065,006 discloses a direct-contact type image sensor in which an optical fiber array is used, as is shown in FIGS. 10 to 12. In the image sensor disclosed in this patent, a black-color film is provided on each of the opposite sides of the transparent substrate so as to reduce the above-mentioned optical crosstalk and flare light. As is shown in FIG. 12, a black-color film 98 is formed on each side of a transparent glass substrate 97 by screen printing, except in a region through which light is transmitted. An optical fiber array 93 is formed by interposing a multitude of optical fibers shown in FIG. 11 between two portions of the transparent glass substrate 97 and heating the optical fibers at a temperature corresponding to the melting point of glass. Then, a black-color film 98 is formed by applying black resin on the transparent glass substrate 97 by screen printing.

However, the above-mentioned prior art has the following problems: In forming the optical fiber array 93 by compressing the multitude of individual optical fibers, as is shown in FIG. 13A, a boundary line between the optical fiber array 93 and the transparent glass substrate 97 does not necessarily constitute a straight line, but may be an irregular curve having some distortion. In order to form a slit for transmitting light to illuminate the document original 90, the black resin must be applied on the transparent glass substrate 97 while keeping at a distance, as seen from above, from the optical fiber array 93. However, it is difficult to form the black-color film 98 by a screen printing method so as to follow the irregular curve of the boundary line. As a result, the black-color film 98 inevitably is formed having a straight line at its boundary line with the slit, as is shown in FIG. 13B. Accordingly, the width of the resultant slit fluctuates depending on the point of measurement. The fluctuation is, at maximum, approximately 200 μm (peak to peak). When the slit is formed with such an accuracy with respect to the width thereof, the amount of light used for reading an image also fluctuates, resulting in fluctuation of ±15% or more in the illuminance at a face of the document original 90. Therefore, the image sensor device inevitably has variations in sensitivity.

SUMMARY OF THE INVENTION

According to the present invention, a direct-contact type image sensor device is provided in which an image sensor chip having electrodes and a photosensitive element array is mounted on an optical fiber array plate by a flip-chip-bonding method, wherein the optical fiber array plate includes a first opaque substrate, a second opaque substrate, an optical fiber array formed by arranging a plurality of optical fibers, and a transparent member disposed in contact with a side face of the optical fiber array, the optical fiber array and the transparent member being interposed between the first and second opaque substrates, and wherein each of the plurality of optical fibers includes center core, a clad provided on an outer surface of the core, and a light absorbing layer provided on an outer surface of the clad, and wherein the image sensor chip is provided in such a way that the photosensitive element array is disposed along an upper end of the optical fiber array and in a portion of the optical fiber array plate except the transparent member, the transparent member forming a slit for transmitting light.

Alternatively, a direct-contact type image sensor device is provided in which an image sensor chip having electrodes and a photosensitive element array is mounted on an optical fiber array plate by a flip-chip-bonding method, wherein the optical fiber array plate includes a first opaque substrate, a second opaque substrate, a first optical fiber array formed by arranging a plurality of first optical fibers and a second optical fiber array formed by arranging a plurality of second optical fibers and formed in contact with a side face of the first optical fiber array, the first and second optical fiber arrays being interposed between the first and second opaque substrates, and wherein each of the plurality of first optical fibers includes a center core, a clad provided on an outer surface of the core, and a light absorbing layer provided on an outer surface of the clad, and wherein each of the plurality of second optical fibers includes a center core and a clad provided on an outer surface of the core, and wherein the image sensor chip is provided in such a way that the photosensitive element array is disposed along an upper end of the first optical fiber array and in a portion of the optical fiber array plate except the second optical fiber array, the second optical fiber array forming a slit for transmitting light.

Alternatively, a direct-contact type image sensor device is provided in which an image sensor chip having electrodes and a photosensitive element array is mounted on an optical fiber array plate by a flip-chip-bonding method, wherein the optical fiber array plate includes a first substrate, a second substrate, an optical fiber array formed by arranging a plurality of optical fibers, and a transparent member disposed in contact with a side face of the optical fiber array, the optical fiber array and the transparant member being interposed between the first and second substrates, and a side-face light absorbing layer is provided at an interface between the optical fiber array and the first substrate and an interface between the transparent member and the second substrate, and wherein each of the plurality of optical fibers includes a center core, a clad provided on an outer surface of the core, and a light absorbing layer provided on an outer surface of the clad, and wherein the image sensor chip is provided in such a way that the photosensitive element array is disposed along an upper end of the optical fiber array and in a portion of the optical fiber array plate except the transparent member, the transparent member forming a slit for transmitting light.

Alternatively, a direct-contact type image sensor device is provided in which an image sensor chip having electrodes and a photosensitive element array is mounted on an optical fiber array plate by a flip-chip-bonding method, wherein the optical fiber array plate includes a first substrate, a second substrate, a first optical fiber array formed by arranging a plurality of first optical fibers and a second optical fiber array formed by arranging a plurality of second optical fibers and formed in contact with a side face of the first optical fiber array, the first end second optical fiber arrays being interposed between the first and second substrates, and a side-face light absorbing layer is provided at an interface between the first optical fiber array and the first substrate and an interface between the second optical fiber array and the second substrate, and wherein each of the plurality of first optical fibers includes a center core, a clad provided on an outer surface of the core, and a light absorbing layer provided on an outer surface of the clad, and wherein each of the plurality of second optical fibers includes a center core and a clad provided on an outer source of the core, end wherein the image sensor chip is provided in such a way that the photosensitive element array is disposed along an upper end of the first optical fiber array and in a portion of the optical fiber array plate except the second optical fiber array, the second optical fiber array forming a slit for transmitting light.

In one embodiment of the invention, a plurality of first light absorbing layers are provided within the optical fiber array, each of the plurality of first light absorbing layers being provided so as to be in a plane perpendicular to the side face of the optical fiber array and at a predetermined pitch along a main-scanning direction of the image sensor device.

In another embodiment of the invention, a plurality of first light absorbing layers are provided within the first optical fiber array, each of the plurality of first light absorbing layers being provided so as to be in a plane perpendicular to the side face of the first optical fiber array and at a predetermined pitch along a main-scanning direction of the image sensor device.

In still another embodiment of the invention, a second light absorbing layer is provided at an end of the transparent member which comes in contact with a document original.

In still another embodiment of the invention, a second light absorbing layer is provided at an end of the second optical fiber array which comes in contact with document original.

In still another embodiment of the invention, the image sensor chip is a silicon crystal type IC chip, and wherein the photosensitive element array is e phototransistor array or a photodiode array.

In still another embodiment of the invention, a circuit conductor layer is provided on the first opaque substrate and a metal bump is provided on each electrode of the image sensor chip.

In still another embodiment of the invention, a circuit conductor layer is provided on the first substrate and a metal bump is provided on each electrode of the image sensor chap.

In still another embodiment of the invention, the circuit conductor layer is formed by thick-film printing an electrically conductive paste.

In still another embodiment of the invention, the circuit conductor layer is a flexible printed wiring board.

In still another embodiment of the invention, the image sensor chip is mounted on the optical fiber array plate with transparent photo-curable insulating resin interposed therebetween.

In still another embodiment of the invention, a refractive index $n_0$ of the core of each optical fiber, a refractive index $n_1$ of the clad, a thickness T of the optical fiber array (i.e. the length of each optical fiber), and a width $W_1$ of the optical fiber array satisfy the relationship:

$$W_1/T \leq \tan[\sin^{-1}\{(n_0^2 - n_1^2)^{\frac{1}{2}}/n_0\}]$$

In still another embodiment of the invention, a refractive index $n_0$ of the core of each of the first optical fibers, a refractive index $n_1$ of the clad, a thickness T of the first optical fiber array (i.e. the length of each of the first optical fibers), and a width $W_1$ of the first optical fiber array satisfy the relationship:

$$W_1/T \leq \tan[\sin^{-1}\{(n_0^2 - n_1^2)^{\frac{1}{2}}/n_0\}]$$

In still another embodiment of the invention, a refractive index $n_0$ of the core of each of the second optical fibers, a refractive index $n_1$ of the clad, a thickness T of the second optical fiber array (i.e. the length of each of the second optical fibers), and a width $W_2$ of the second optical fiber array satisfy the relationship:

$$W_2/T \leq \tan[\sin^{-1}\{(n_0^2 - n_1^2)^{\frac{1}{2}}/n_0\}]$$

In still another embodiment of the invention, a width $W_0$ of the transparent member satisfies the relationship:

$$0.3 \text{ mm} < W_0 < 0.8 \text{ mm}$$

In still another embodiment of the invention, a refractive index $n_0$ of the core of each optical fiber, refractive index $n_1$ of the clad, a thickness T of the optical fiber array (i.e. the length of each optical fiber), and the predetermined pitch P of the plurality of first light absorbing layers satisfy the relationship:

$$P/T \leq \tan[\sin^{-1}\{(n_0^2 - n_1^2)^{\frac{1}{2}}/n_0\}]$$

In still another embodiment of the invention, a refractive index $n_0$ of the core of each of the first optical fibers, a refractive index $n_1$ of the clad, a thickness T of the first optical fiber array (i.e. the length of each of the first optical fibers), and the predetermined pitch P of the plurality of first light absorbing layers satisfy the relationship:

$$P/T \leq \tan]\sin^{-1}\{(n_0^2 - n_1^2)^{\frac{1}{2}}/n_0\}]$$

In another aspect of the present invention, a direct-contact type image sensor unit is provided which includes an image sensor device according to the present invention and a light source disposed above the image sensor chip and leaning toward the second opaque substrate of the image sensor device, wherein the light source irradiates a document original with light through the transparent member and the optical fiber array.

In another aspect of the present invention, a direct-contact type image sensor unit is provided which includes an image sensor device according to the present invention and a light source disposed above the image sensor chip and leaning toward the second substrate of the image sensor device, wherein the light source irradiates a document original with light through the transparent member and the optical fiber array.

In one embodiment of the invention, light emitted from the light source is incident on the document original at an incident angle in the range of 30° to 60°.

Thus, the invention described herein makes possible the advantages of (1) providing a direct-contact type image sensor device in which optical cross-talk and flare light are removed, thereby attaining high image-reading performance, and (2) providing an image sensor unit in which the direct-contact type image sensor device is used.

These and other advantages of the present invention will become apparent to those skilled in the art upon reading and understanding the following detailed description with reference to the accompanying figures.

BRIEF DESCRIPTION OF THE DRAWINGS

FIG. 6 is a front sectional view showing a direct-contact type image sensor unit according to a second example of the present invention.

FIG. 7 is a front sectional view showing a direct-contact type image sensor unit according to a third example of the present invention.

FIG. 8 is a front sectional view showing a direct-contact type image sensor unit according to a third example of the present invention.

DESCRIPTION OF THE PREFERRED EMBODIMENTS

Hereinafter, the present invention will be described by way of examples, with reference to the accompanying drawings.

Example 1

Hereinafter, a first example of the present invention will be described with reference to the accompanying drawings.

Figure 1A:
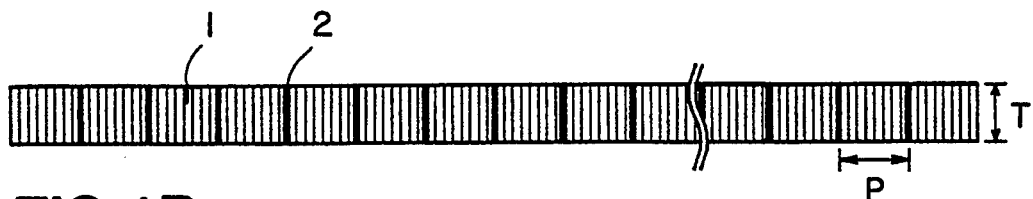
FIG. 1A is a side sectional view showing an optical fiber array plate of an image sensor device according to a first example of the present invention.
Figure 1B:
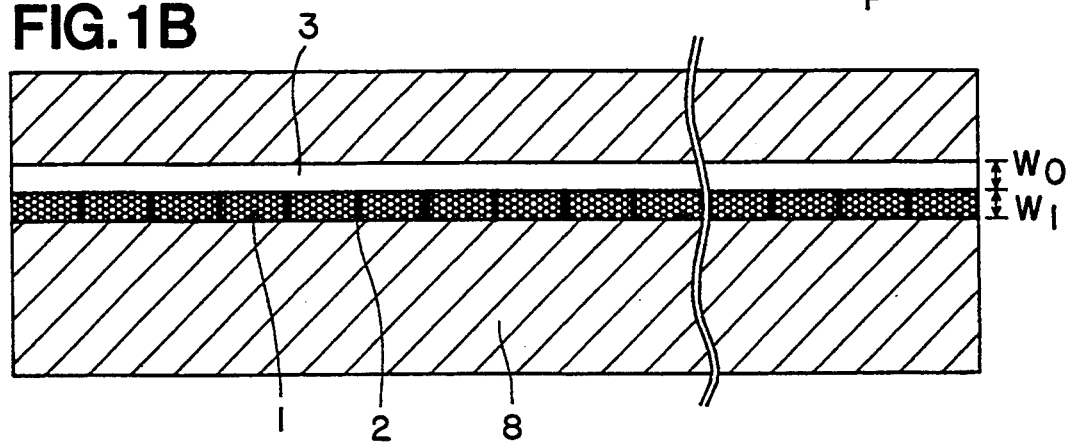
FIG. 1B is a plan view of an optical fiber array plate of an image sensor device according to a first example of the present invention.

FIGS. 1A and 1B are, respectively, a cross-sectional view of an optical fiber portion and a plan view of an optical fiber array plate of an image sensor device according to the present example. Reference numeral 1 denotes the optical fiber array for leading optical information from a document original therethrough. Reference numeral 2 denotes first light absorbing layers formed within the optical fiber array 1 at a predetermined pitch P so as to be in a plane which is perpendicular to a main-scanning direction of the image sensor device, i.e. a direction in which photosensitive elements of the image sensor are arranged. However, the first light absorbing layers 2 are not essential components of the present invention. As is seen from FIG. 1B, a transparent glass member 3 is provided in direct contact with a side face of the optical fiber array 1. The optical fiber array 1 and the transparent glass member 3 are interposed between a pair of opaque glass substrates 8.

Herein, the term 'opaque' is employed to mean 'having light transmittance of 20% or less'. As for opaque glass substrates, absorption rate of light thereof is considered more preferable as it approaches 100%.

Figure 2:
FIG. 2 is a view showing the structure of an optical fiber according to a first example of the present invention.

FIG. 2 is a view showing the structure of an optical fiber included in the optical fiber array 1. As is shown in FIG. 2, the optical fiber includes a core 11, a clad 12 formed on the outer surface of the core 11, and a light absorbing layer 13 formed on the outer surface of the clad 12.

Figure 3:
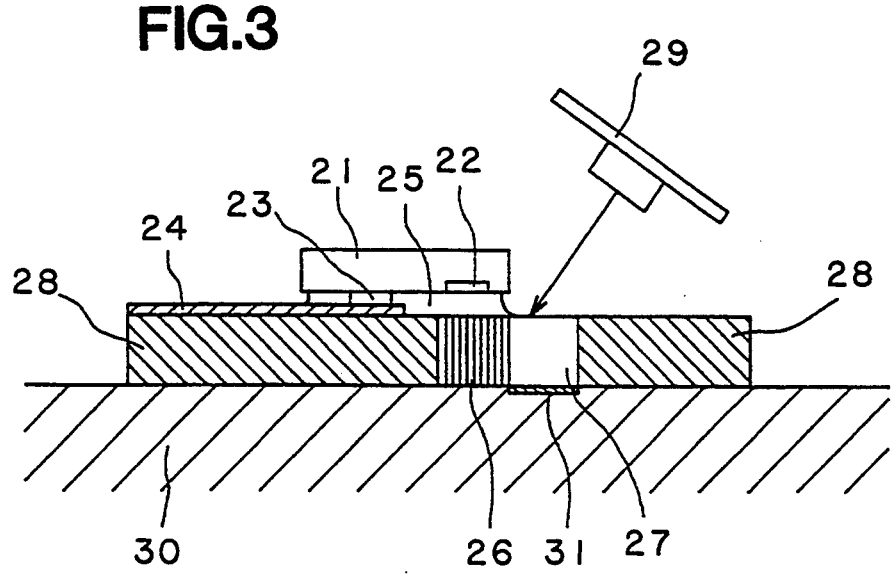
FIG. 3 is a front sectional view showing a direct-contact type image sensor unit according to a first example of the present invention.

FIG. 3 is a front sectional view showing a direct-contact type image sensor unit according to the present example. As is shown in FIG. 3, the image sensor unit includes an image sensor chip 21, a photosensitive element array 22 formed on a surface of the image sensor chip 21, electrodes 23 formed on the surface of the image sensor chip 21, a circuit conductor layer 24 formed on a surface of an opaque glass substrate 28, an optical fiber array 26 (i.e. the optical fiber array 1 in FIG. 1; hereinafter, the same applies unless otherwise specified) disposed so as to correspond to the photosensitive element array 22, a transparent glass member 27 (i.e. the transparent glass member 3 in FIG. 1; hereinafter, the same applies unless otherwise specified) disposed in direct contact with a side face of the optical fiber array 26, a pair of opaque glass substrates 28 (i.e.

the pair of opaque glass substrates 8 in FIG. 1; hereinafter, the same applies unless otherwise specified) disposed so as to interpose the optical fiber array 26 and the image sensor chip 21 therebetween, transparent photo-curable insulating resin 25 for mounting the image sensor chip 21 on the opaque glass substrate 28 and the optical fiber array 26, an LED array 29 as a light source for illuminating a document original 30 carrying information to be read, and a second light absorbing layer 31 disposed on a surface of the transparent glass member 27 which comes in contact with the document original 30.

Hereinafter, details of the direct-contact type image sensor device and image sensor unit having the above configurations will be described.

First, the image sensor chip 21 is fabricated in he following manner: By a common semiconductor-fabricating process, the photosensitive element array 22 composed of phototransistors, photodiodes, etc. and an access circuit (no shown) including CCDs (Charge Coupled Devices), MOS (Metal Oxide Semiconductor)-ICs (Integrated Circuits), or bipolar ICs are formed on a single-crystal silicon substrate (silicon wafer). Each electrode 23 is obtained by forming a wire bump made of Au on an electrode made of Al by a wire-bonding method. Then, after confirming that devices formed on the silicon wafer operates satisfactorily, the silicon wafer is cut out by a fine dicing technique so as to form the image sensor chip 21.

Next, the light absorbing layer 13 having a thickness of 2 to 3 μm is formed on the outer surface of the clad 12 of an optical fiber having a diameter of about 25 μm. A multitude of such optical fibers are arranged parallelly in a band-like configuration to form the optical fiber array 26. The light absorbing layer 13 is made of a material such as an ordinary glass containing a metal oxide including Mn, Cr, or the like therein.

The transparent glass member 27 is disposed on a side face of the optical fiber array 26 so as to be in contact therewith. Then, the optical fiber array 26 and the transparent glass member 27 are interposed between the pair of opaque glass substrates 28 and are heated at a temperature corresponding to the melting point of glass (about 550° C. to about 600° C.) while being pressed from both sides, so as to form an optical fiber array plate.

In cases where the first light absorbing layers 2 are provided within the optical fiber array 26, the optical fiber array 26 is fabricated in the following manner: First, several hundreds of individual optical fibers are combined into a bundle, and are covered with a light absorbing layer formed therearound; thus, a multi-fiber is obtained. Such multi-fibers are arranged in a row so as to form the optical fiber array 26. The resultant optical fiber array 26 has such a configuration that there are two light absorbing layers combined as one in a portion where two multi-fibers adjoin each other, and that there is only one light absorbing layer on each side face of the optical fiber array 26. In other words, the light absorbing layer is single-layered along a direction of the side faces of the optical fiber array 26, while it is double-layered in a direction perpendicular to the direction of the side faces of the optical fiber array 26. In addition, since the optical fiber array 26 is compressed from both sides, the light absorbing layer becomes sufficiently thin along the direction of the side faces of the optical fiber array 26 (i.e. the main-scanning direction), while it is formed sufficiently thick in the direction perpendicular thereto. The double-layered portions of the light absorbing layer, which are formed perpendicularly to the direction of the side faces of the optical fiber array 26, serve as the first light absorbing layers 2.

Next, the circuit conductor layer 24 is formed, using precious metals such as Au or Ag—Pt, on one face of the opaque glass substrate 28 by screen printing. The circuit conductor layer 24 may alternatively be formed by applying a flexible printed wiring board thereon. Furthermore, black resin is applied on the other face of the transparent glass member 27, that is, the face which comes in direct contact with the document original, by screen, printing, so as to form the second light absorbing layer 31. Then, the image sensor chip 21 fabricated in the above-mentioned manner is mounted on the optical fiber array plate by a face-down bonding method An such a way that the photosensitive element array 22 is disposed on the optical fiber array 26 and that the electrodes 23 are connected to predetermined portions of the circuit conductor layer 24, with the transparent photo-curable insulating resin 25 being interposed between the image sensor chip 21 and the optical fiber array plate.

As has been described, the portion which serves as a slit for transmitting light is composed of the transparent glass member 27 interposed between the opaque glass substrates 28. According to such a configuration, even if a boundary line between the optical fiber array 26 and the transparent glass member 27 is slightly curved during the heating/compressing process, a boundary line between the transparent glass member 27 and the adjoining opaque glass substrate 28 curves correspondingly. Therefore, the width of the slit, which is substantially identical with that of the transparent glass member 27, does no change from position to position along the main-scanning direction.

Thus, the fabrication accuracy of the width of the slit is improved, reducing the fluctuation thereof to, at maximum, about 70 μm (peak to peak). The fluctuation in illuminance at a face of the document original 30 is reduced to ±10%.

The document original 30 is attached to a bottom face of this direct-contact type image sensor device, and is illuminated with light which is emitted from the LED array 29 serving as the light source and enters through the transparent glass member 27 and the optical fiber array 26. Light reflected from the document original 30 is led through the optical fiber array 26 so as to be incident on the photosensitive element array 22 without having optical crosstalk, the optical information being of one-on-one correspondence relationship.

The light transmittance of the light absorbing layer 13 of each optical fiber included in the optical fiber array 26 is prescribed to be about 20% so that some light is transmitted therethrough. The second light absorbing layer 31 should preferably be such that its light transmittance is 0% (that is, the absorption rate of light thereof should preferably be 100%), so that light emitted from the light source 29 may not be reflected from portions of the document original 30 except a portion thereof which carries image information to be read. Since there are provided the opaque glass substrate 28, the second light absorbing layer 31, and the like, a portion of light emitted from the LED array 29 and going directly into the photosensitive element array 22 (i.e. flare light) ad a portion of light which is not reflected from any other place than the document original 30 are eliminated.

In particular, an unnecessary component of light (optical crosstalk) entering in the sub-scanning direction (a direction in which the document original 30 is fed), that is, a portion of light which is reflected from the surface of the document original 30 and enters at an angle larger than the angular aperture of each optical fiber, can be effectively prevented from reaching the photosensitive element array 22 under some suitable conditions. The conditions are satisfied when the relationship described below holds between a refractive index $n_0$ of the core 11 of each optical fiber, a refractive index $n_1$ of he clad 12, a thickness T of the optical fiber array 26, and a width $W_1$ of the optical fiber array 26:

$$W_1/T \leq \tan[\sin^{-1}\{(n_0^2-n_1^2)^{\frac{1}{2}}/n_0\}]$$

The resolution of the image sensor device (MTF value: Modulation-Transfer-Function value) is improved especially when the above-mentioned relationship holds.

The resolution of the image sensor device (MTF value) is also improved when the width $W_0$ of the transparent glass member 27 serving as the slit for transmitting light satisfies the following relationship:

$$0.3 \text{ mm} < W_0 < 0.8 \text{ mm}$$

The resolution (MTF value) is improved because light is utilized at an improved efficiency, and flare light is reduced under the above relationship. In addition the output power of the light source 29 can be reduced without undermining the operation performance of the image sensor device, since light for illuminating the document original 30 is utilized efficiently.

The resolution (MTP value) of the image sensor device can also be improved when a pitch P at which the first light absorbing layers 2 are formed within the optical fiber array 26 satisfies the following relationship in particular, along with the refractive index $n_0$ of the core 11 of each optical fiber, the refractive index $n_1$ of the clad 12, and the thickness T of the optical fiber array 26:

$$P/T \leq \tan[\sin^{-1}\{(n_0^2-n_1^2)^{\frac{1}{2}}/n_0\}]$$

Under the above relationship, an unnecessary portion of light entering in the main-scanning direction (optical crosstalk), that is, a portion of light which is reflected from the surface of the document original 30 and enters at an angle larger than the angular aperture of each optical fiber, can be effectively prevented from reaching the photosensitive element array 22.

For example, an image sensor device including a photosensitive element array of an 8 dots/mm type achieved an MTF value of 85% (4 lp/mm), thus proving high reading performance, under the following condition, which satisfies the above relationship(s):

T=2 mm, $W_1$=0.45 mm, $W_0$=0.5 mm, P=0.6 mm, $n_0$=1.6, and $n_1$=1.5

Moreover, when an incident angle (H) at which light from the light source 29 illuminates the document original 30 satisfies the relationship $30° \leq$ (H) $\leq 60°$, in particular, light can be utilized at high efficiency and flare light can be restrained to a small amount. By optimizing the incident angle of the light from the light source 29, not only the resolution (MTF value) of the image sensor device can be improved, but also the output power of the light source 29 can be curtailed.

Example 2

Hereinafter, a second example of the present invention will be described with reference to the accompanying drawings.

Figure 4A:
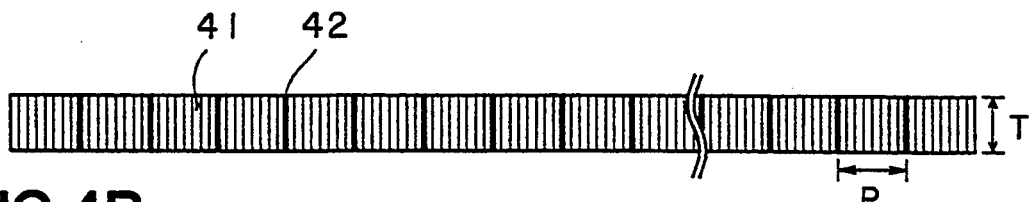
FIG. 4A is a side sectional view showing an optical fiber array plate of an image sensor device according to a second example of the present invention.
Figure 4B:
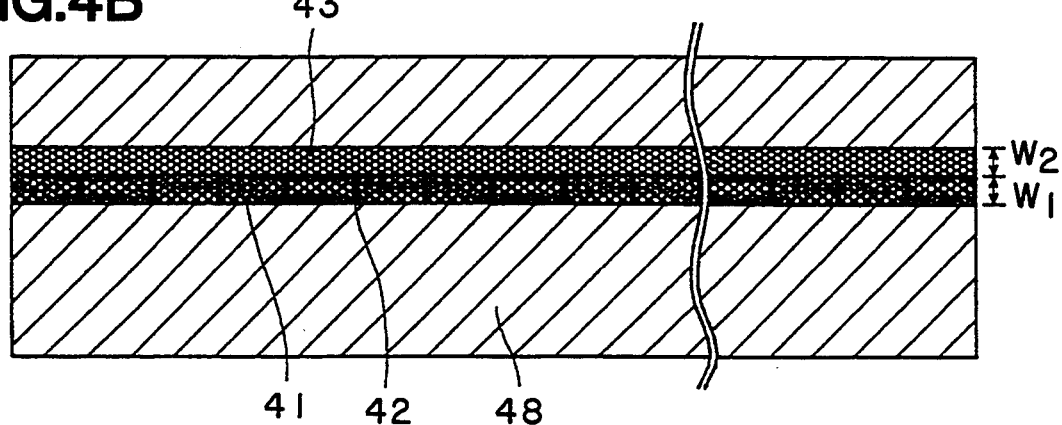
FIG. 4B is a plan view of an optical fiber array plate of an image sensor device according to a second example of the present invention.

FIGS. 4A and 4B are, respectively, a cross-sectional view of an optical fiber array portion and a plan view of an optical fiber array plate of an image sensor device according to the present example. Reference numeral 41 denotes a first optical fiber array for leading optical information from a document original therethrough. Reference numeral 42 denotes first light absorbing layers formed within the first optical fiber array 41 at a predetermined pitch P so as to be in a plane which is perpendicular to a main-scanning direction. However, the first light absorbing layers 42 are not essential components of the present invention. As is seen from FIG. 4B, a second optical fiber array 43 is provided in direct contact with a side face of the first optical fiber array 41. The first optical fiber array 41 and the second optical fiber array 43 are interposed between a pair of opaque glass substrates 48.

Figure 5A:
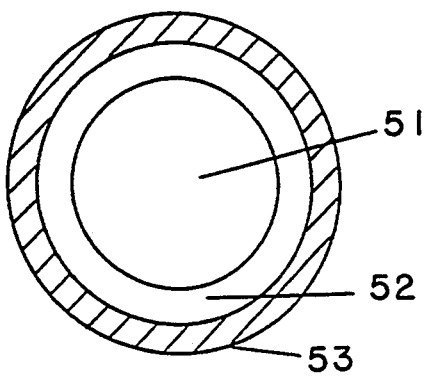
FIG. 5A is a view showing the structure of an optical fiber included in a first optical fiber array according to a second example of the present invention.
Figure 5B:
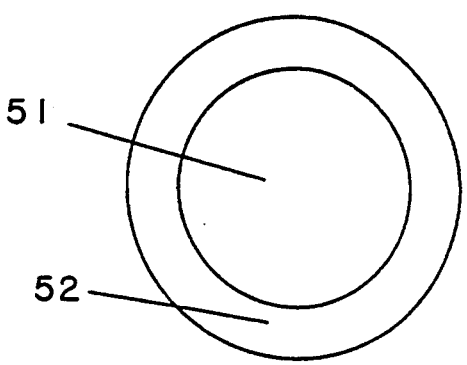
FIG. 5B is a view showing the structure of an optical fiber included in a second optical fiber array according to a second example of the present invention.
Figure 9A:
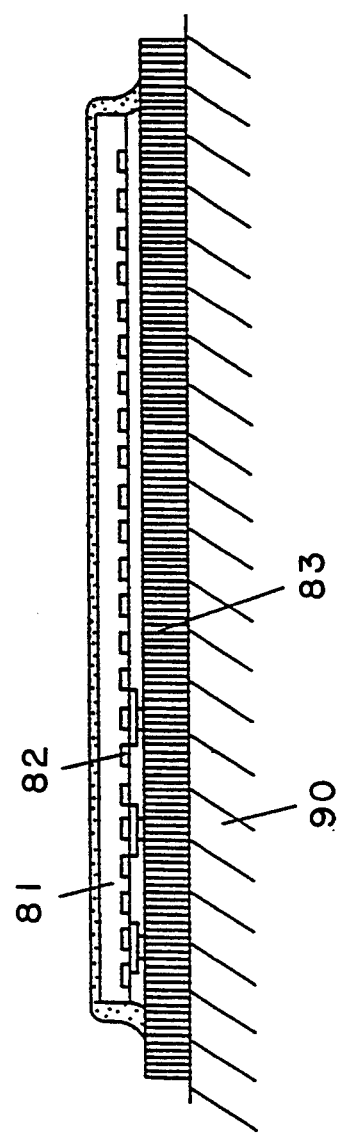
FIG. 9A is a front sectional view showing a conventional image sensor unit.
Figure 9B:
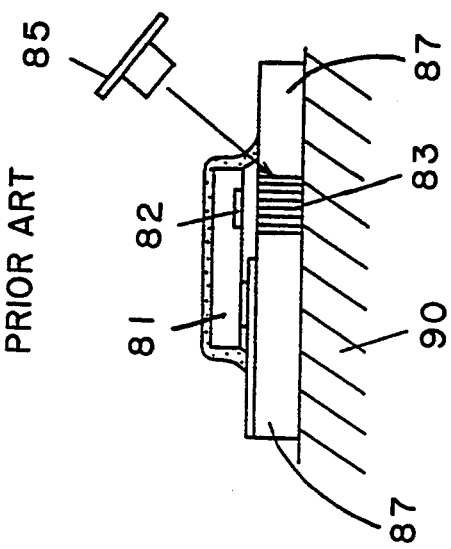
FIG. 9B is a side sectional view showing conventional image sensor unit.
Figure 10:
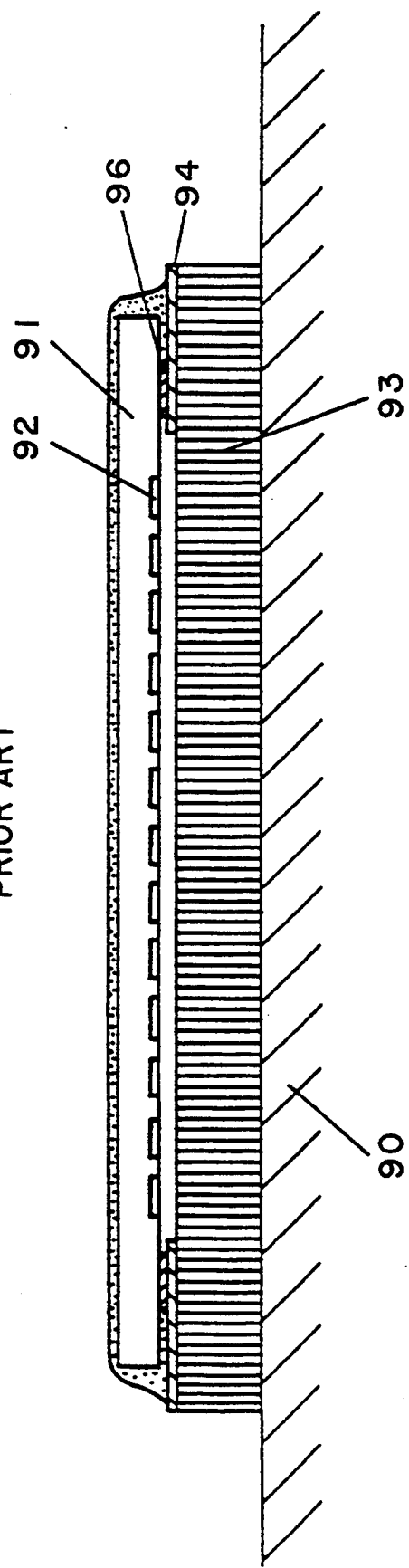
FIG. 10 is a side sectional view showing a conventional image sensor unit.
Figure 11:
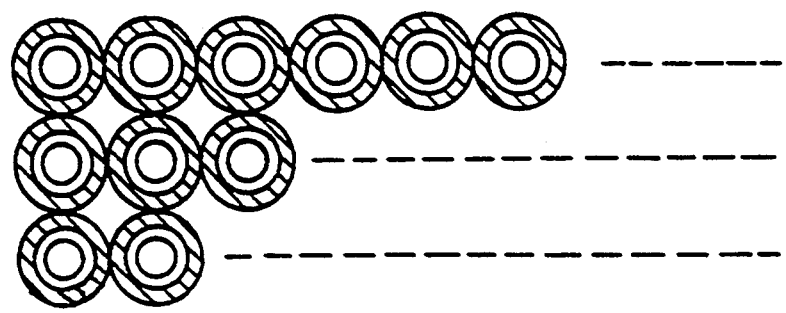
FIG. 11 is a view showing an arrangement for optical fibers in a conventional image sensor unit.
Figure 12:
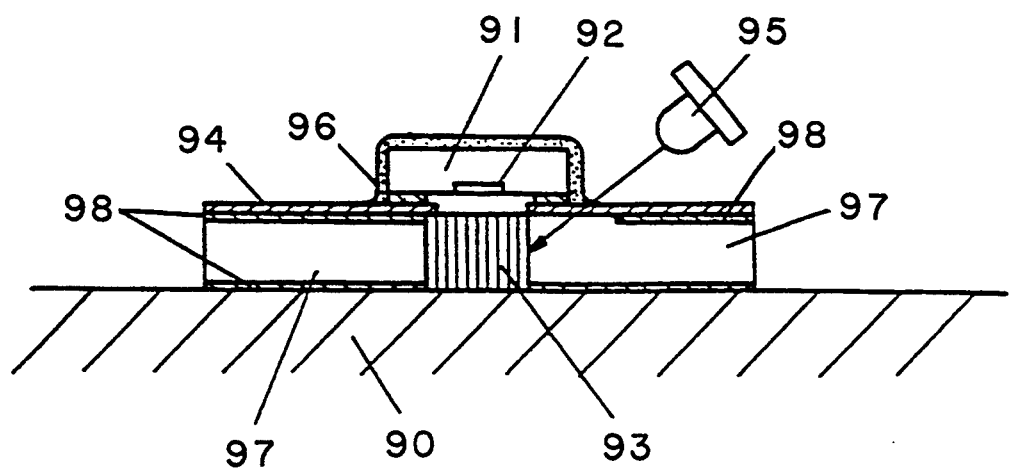
FIG. 12 is a front sectional view showing a conventional image sensor unit.
Figure 13A:
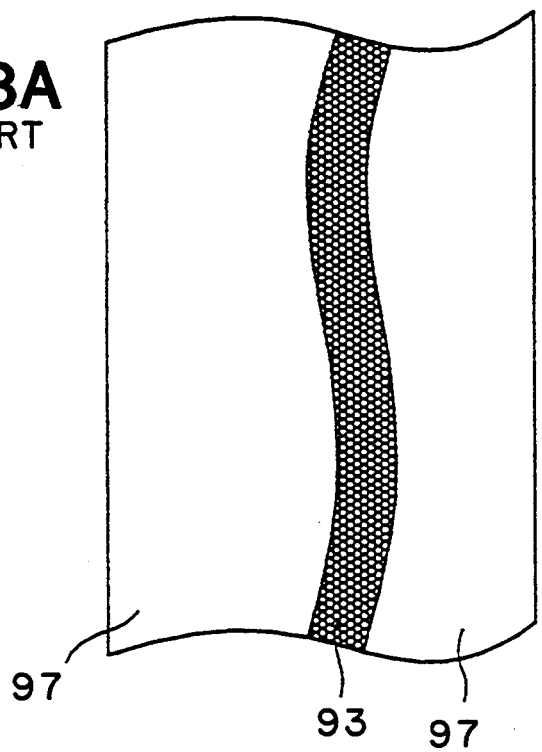
FIG. 13A is a plan view showing an optical fiber array plate in a conventional image sensor device.
Figure 13B:
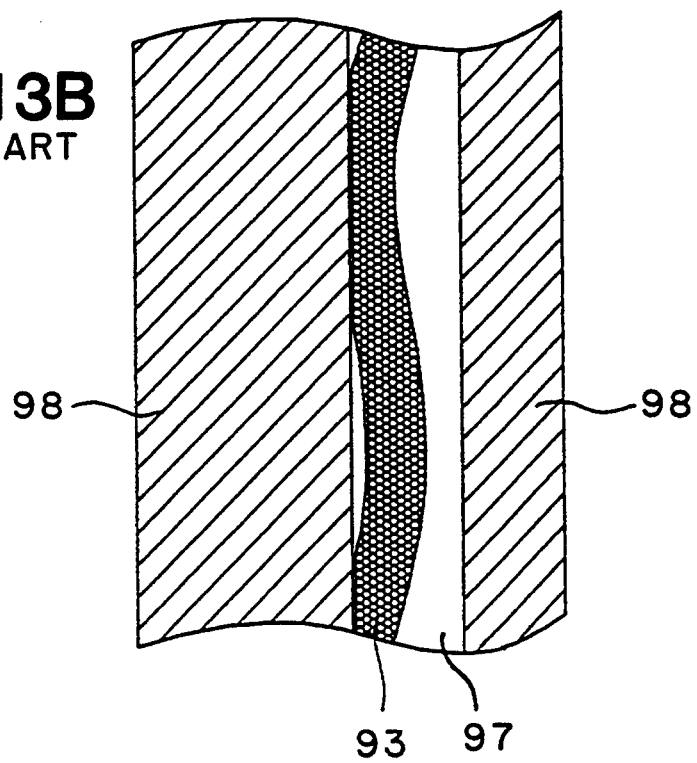
FIG. 13B is a plane view showing an optical fiber array plate shown in FIG. 13A when black resin has been applied thereon.

FIGS. 5A and 5B are views showing the structures of, respectively, an optical fiber included in the first optical fiber array 41 and an optical fiber included in the second optical fiber array 43. As is shown in FIGS. 5A and 5B, each optical fiber includes a core 51 and a clad 52 formed on the outer surface of the core 51. While each optical fiber included in the first optical fiber array 41 further has a light absorbing layer 53 formed on the outer surface of the clad 52 thereof, each optical fiber included in the second optical fiber array 43 does not have a light absorbing layer.

FIG. 6 is a front sectional view showing a direct-contact type image sensor unit according to the present example. As is shown in FIG. 6, the image sensor unit includes an image sensor chip 61, a photosensitive element array 62 formed on a surface of the image sensor chip 61, electrodes 63 formed on the surface of the image sensor chip 61, a circuit conductor layer 64 formed on a surface of an opaque glass substrate 68, a first optical faber array 66 (i.e. the first optical fiber array 41 in FIGS. 4a and 4B; hereinafter, the same applies unless otherwise specified) disposed so as to correspond to the photosensitive element array 62, a second optical fiber array 67 (i.e. the second optical fiber array 43 in FIGS. 4A and 4B; hereinafter, the same applies unless otherwise specified) disposed in contact with a side face of the first optical fiber array 66, a pair of opaque glass substrates 68 (i.e. the pair of opaque glass substrates 48 in FIGS. 4A and 4B; hereinafter, the same applies unless otherwise specified) disposed so as to interpose the first optical fiber array 65 and the image sensor chip 61 Therebetween, transparent photocurable insulating resin 65 for mounting the image sensor chip 61 on the opaque glass substrate 68 and the first optical fiber array 66, an LED array 69 as a light source for illuminating a document original 70 carrying information to be read, and a second light absorbing layer 71 disposed on a surface of the second optical fiber array 67 which comes in contact with the document original 70.

Hereinafter, details of the direct-contact type image sensor device and image sensor unit having the above configurations will be described.

First, the image sensor chip 61 is fabricated in the following manner: By a common semiconductor-fabricating process, the photosensitive element array 62 composed of phototransistors, photodiodes, etc. and an access circuit (not shown) including CCDs, MOS-ICs, or bipolar ICs are formed on a single-crystal silicon substrate (silicon wafer). Each electrode 63 is obtained by forming a wire bump made of Au on an electrode made of Al by a wire-bonding method. Then, after confirming that devices formed on the silicon wafer operates satisfactorily, the silicon wafer is cut our by a fine dicing technique so as to form the image sensor chip 61.

Next, the light absorbing layer 53 having a thickness of 2 to 3 μm is formed on the outer surface of the clad 52 of an optical fiber having a diameter of about 25 μm. A multitude of such optical fibers are arranged parallelly in a band-like configuration to form the first optical fiber array 66. Moreover, optical fibers each having a diameter of 25 μm are arranged parallelly in a band-like configuration to form the second optical fiber array 67. The light absorbing layer 53 is made of a material such as an ordinary glass containing a metal oxide including Mn, Cr, or the like therein.

The first optical fiber array 66 and the second optical fiber array 67 are disposed side by side so as to be in complete contact with each other. Then, the first optical fiber array 66 and the second optical fiber array 67 are interposed between the pair of opaque glass substrates 68 and are heated at a temperature corresponding to the melting point of glass (about 550° C. to about 600° C.) while being pressed from both sides, so as to form an optical fiber array In cases where the first light absorbing layers 42 are provided within the first optical fiber array 66, the first optical fiber array 66 is fabricated in the following manner: First, several hundreds of individual optical fibers are combined into a bundle, and are covered with a light absorbing layer formed therearound; thus, a multifiber is obtained. Such multi-fibers are arranged in a row to form the first optical fiber array 66. The resultant first optical fiber array 66 has such a configuration that there are two light absorbing layers combined as one in a portion where two multi-fibers adjoin each other, and that there is only one light absorbing layer on each side face of the first optical fiber array 66. In other words, the light absorbing layer is single-layered along a direction of the side faces of the first optical fiber array 66, while it is double-layered in a direction perpendicular to the direction of the side faces of the first optical fiber array 66. In addition, since the first optical fiber array 66 is compressed from both sides, the light absorbing layer becomes sufficiently thin along the direction of the side faces of the first optical fiber array 66 (i.e. the main-scanning direction), while it is formed sufficiently thick in the direction perpendicular thereto. The double-layered portions of the light absorbing layer, which are formed perpendicularly to the direction of the side faces of the first optical fiber array 66, serve as the first light absorbing layers 42.

Next, the circuit conductor layer 64 is formed, using precious metals such as Au or Ag—Pt, on one face of the opaque glass substrate 68 by screen printing. The circuit conductor layer 64 may alternatively be formed by applying a flexible printed wiring board thereon. Furthermore, black resin is applied on the other face of the second optical fiber array 67, that is, the face which comes in direct contact with the document original, by screen printing, so as to form the second light absorbing layer 71. Then, the image sensor chip 61 fabricated in the above-mentioned manner is mounted on the optical fiber array plate by a face-down bonding method in such a way that the photosensitive element array 62 is disposed on the first optical fiber array 66 and that the electrodes 63 are connected to predetermined portions of the circuit conductor layer 64, with the transparent photo-curable insulating resin 65 being interposed between the image sensor chip 61 and the optical fiber array plate.

As has been described, the portion which serves as a slit for transmitting light is composed of the second optical fiber array 67 interposed between the opaque glass substrates 68. According to such a configuration, even if a boundary line between the first optical fiber array 66 and the second optical fiber array 67 is curved during the heating/compressing process, a boundary line between the second optical fiber array 67 and the adjoining opaque glass substrate 68 curves correspondingly. Therefore, the width of the slit, which is substantially identical with that of the second optical fiber array 67, does not change from position to position along the main-scanning direction.

Thus, the fabrication accuracy of the width of the slit is improved, reducing the fluctuation thereof to, at maximum, about 70 μm (peak to peak). The fluctuation in illuminance at a face of the document original 70 is reduced to ±10%.

The document original 70 is attached to a bottom face of this direct-contact type image sensor device, and is illuminated with light which is emitted from the LED array 69 serving as the light source and enters through the second optical fiber array 67 and the first optical fiber array 66. Light reflected from the document original 70 is led through the first optical fiber array 66 so as to be incident on the photosensitive element array 62 without having optical crosstalk, the optical information being of one-on-one correspondence relationship.

The light transmittance of the light absorbing layer 53 of each optical fiber included in the first optical fiber array 66 is prescribed to be about 20% so that some light is transmitted therethrough. Since there are provided the opaque glass substrate 68, the second light absorbing layer 71, and the like, a portion of light emitted from he LED array 69 and going directly into the photosensitive element array 62 (i.e. flare light) and a portion of light which is not reflected from any other place than the document original 70 are eliminated.

In particular, an unnecessary component of light entering in the sub-scanning direction (optical crosstalk), that is, a portion of light which is reflected from the surface of the document original 70 and enters at an angle larger than the angular aperture of each optical fiber, can be effectively prevented from reaching the photosensitive element array 62 under some suitable conditions. The conditions are satisfied when the relationship described below holds between a refractive index $n_0$ of the core 51 of each optical fiber in the first optical fiber array 66, a refractive index $n_1$ of the clad 52, a thickness T of the first optical fiber array 66, and a width $W_1$ of the first optical fiber array 66:

$$W_1/T \leq \tan[\sin^{-1}\{(n_0^2 - n_1^2)^{\frac{1}{2}}/n_0\}]$$

The resolution of the image sensor device (MTF value: Modulation-Transfer-Function value) is improved especially when the above-mentioned relationship holds. The sub-scanning direction also denotes a direction in which the document original 70 is fed.

The resolution of the image sensor device (MTF value) is also improved when the width $W_2$ of the second optical fiber array 67 serving as the slit for transmitting light satisfies the following relationship:

$$0.3 \text{ mm} < W_2 < 0.8 \text{ mm}$$

The resolution (MTF value) is improved because light is utilized at an improved efficiency, and flare light is reduced under the above relationship. Moreover, an ample amount of light can be utilized for illumination of the document original 70. In addition, the output power of the light source 69 can be reduced without undermining the operation performance of the image sensor device, since light for illuminating the document original 70 is utilized efficiently.

The resolution (MTF value) of the image sensor device can also be improved when a pitch P at which the first light absorbing layers 42 are formed within the first optical fiber array 66 satisfies the following relationship in particular, along with the refractive index $n_0$ of the core 51 of each optical fiber, the refractive index $n_1$ of the clad 52, and the thickness T of the first optical fiber array 66:

$$P/T \leq \tan[\sin^{-1}\{(n_0^2 - n_1^2)^{\frac{1}{2}}/n_0\}]$$

Under the above relationship, an unnecessary portion of light entering in the main-scanning direction (optical crosstalk), that is, a portion of light which is reflected from the surface of the document original 70 and enters at an angle larger than the angular aperture of each optical fiber, can be effectively prevented from reaching the photosensitive element array 62.

For example, an image sensor device including a photosensitive element array of an 8 dots/mm type achieved an MTF value of 85% (4 lp/mm), thus proving high reading performance, under the following condition, which satisfies the above relationship(s):

$$T = 2 \text{ mm}, W_1 = 0.45 \text{ mm}, W_2 = 0.5 \text{ mm}, P = 0.6 \text{ mm},$$
$$n_0 = 1.6, \text{ and } n_1 = 1.5$$

Moreover, when an incident angle $\widehat{H}$ at which light from the light source 69 illuminates the document original 70 satisfies the relationship $30° \leq \widehat{H} \leq 60°$, in particular, light can be utilized at high efficiency, and flare light can be restrained to a small amount. By optimizing the incident angle of the light from the light source 69, not only the resolution (MTF value) of the image sensor device can be improved, but also the output power of the light source 9 can be curtailed.

Example 3

FIG. 7 is a front sectional view showing a direct-contact type image sensor device according to a third example of the present invention. The image sensor device of the present example further includes a third light absorbing layer. Components which correspond to those in Example 1 are indicated by the same reference numerals. Descriptions therefor are omitted.

As is shown in FIG. 7, an optical fiber array 28 and a transparent glass member 27 are interposed between a pair of substrates 28'. Between the optical fiber array 26 and one substrate 28', and between the transparent glass member 27 and the other substrate 28', third light absorbing layers 32 are provided. The pair of substrates 28' interposing the optical fiber array 26 and the transparent glass member 27 therebetween do not need to be opaque (i.e. having an absorption coefficient of a certain value or more), unlike in Example 1. Since the third light absorbing layers 32 are provided, an unnecessary portion of light is prevented from illuminating a document original 30, whereby it is made possible to efficiently lead light emitted from a light source 29 (LED array) onto the document original 30. Moreover, unnecessary light (flare light), that is, light reflected from places other than the document original 30 and light entering without being reflected from the document original 30 can be prevented from entering a photosensitive element array 22.

The above-described third light absorbing layers can also be incorporated in an image sensor device having a second optical fiber array, as is shown in FIG. 8. FIG. 8 is a front sectional view showing another direct-contact type image sensor unit according to the present example. Components which correspond to those in Example 2 are indicated by the same reference numerals. Descriptions therefor are omitted.

As is shown in FIG. 8, a first optical fiber array 66 and a second optical fiber array 67 are interposed between a pair of substrates 68'. Between the first optical fiber array 66 and one substrate 68' and between the second optical fiber array 67 and the other substrate 68', third light absorbing layers 72 are provided. The pair of substrates 68' interposing the first optical fiber array 66 and the second optical fiber array 67 therebetween do not need to be opaque, unlike in Example 2. Since the third light absorbing layers 72 are provided, an unnecessary portion of light is prevented from illuminating a document original 70, whereby it is made possible to efficiently lead light emitted from a light source 69 (LED array) onto the document original 70. Moreover, unnecessary light (flare light), that is, light reflected from places other than the document original 70 and light entering without being reflected from the document original can be prevented from entering a photosensitive element array 62.

In the image sensor unit shown in FIG. 7, for example, even if the substrates 28' are transparent, light radiated on the substrates 28' is interrupted in its optical path by the third light absorbing layers 32, and is therefore unable to enter the transparent glass member 27. Therefore, by the incorporation of the third light absorbing layers 32, it is ensured that only light radiated on the transparent glass member 27 can reach the document original 30. Light reflected from portions of the document original 30 except a portion thereof which carries information to be read is also interrupted by the third light absorbing layers 32, and is therefore unable to enter the transparent glass member 27 or the optical fiber array 26. The light absorption coefficient of the third light absorbing layers 32 should be as large as possible, and is preferably 100%. As a result of the incorporation of the third light absorbing layers 32, an improvement in the MTF value of about 10% was confirmed. The same applies to the image sensor unit shown in FIG. 8.

As has been described, according to the present invention, there are provided a direct-contact type image sensor device capable of reading images with high resolution and an image sensor unit in which the image sensor device is used, since optical crosstalk and flare light are eliminated. In order to achieve these effects, an optical fiber array plate in an image sensor device and an image sensor unit according to the present invention has such a configuration that an optical fiber array and a transparent glass member (or a second optical fiber array) are interposed between two opaque glass substrates.

Moreover, since a slit for transmitting light is composed of the transparent glass member interposed between the two opaque glass substrates, the fabrication accuracy of the width of the slit is improved as compared with the case where black resin is applied by screen printing, thereby reducing the fluctuation in illuminance of light radiated on a document original.

Optical crosstalk in a main-scanning direction can be removed by a first light absorbing layer provided within the optical fiber array, and optical crosstalk and flare light can be eliminated by a second light absorbing layer provided on the lower end of the optical fiber array.

Moreover, the same effects can be achieved by incorporating a third light absorbing layer, even in cases where the two substrates are not opaque. In this case, too, a direct-contact type image sensor device capable of reading images with high resolution and an image sensor unit in which the image sensor device is used can be provided, since optical crosstalk and flare light are eliminated.

various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A direct-contact type image sensor device in which an image sensor chip having electrodes and a photosensitive element array is mounted on an optical fiber array plate by a flip-chip-bonding method, wherein
    the optical fiber array plate includes a first opaque substrate, a second opaque substrate, an optical fiber array formed by arranging a plurality of optical fibers, and a transparent member disposed in contact with a side face of the optical fiber array, the optical fiber array and the transparent member being interposed between the first and second opaque substrates, and wherein
    each of the plurality of optical fibers includes a center core, a clad provided on an outer surface of the core, and a light absorbing layer provided on an outer surface of the clad, and wherein
    the image sensor chip is positioned in such a way so that the photosensitive element array is disposed along an upper end of the optical fiber array and in a portion of the optical fiber array plate not including the transparent member, whereby the transparent member forms a slit for transmitting light by using one of the first and second opaque substrates as a light shield, so as to reduce variation in width of the slit along a main scanning direction.

2. An image sensor device according to claim 1, wherein a plurality of first light absorbing layers are provided within the optical fiber array, each of the plurality of first light absorbing layers being provided so as to be in a plane perpendicular to the side face of the optical fiber array and at a predetermined pitch along a main-scanning direction of the image sensor device.

3. An image sensor device according to claim 1, wherein a second light absorbing layer is provided at an end of the transparent member which comes in contact with a document original.

4. An image sensor device according to claim 1, wherein the image sensor chip is a silicon crystal type IC chip, and wherein the photosensitive element array is a phototransistor array or a photodiode array.

5. An image sensor device according to claim 1, wherein a circuit conductor layer is provided on the first opaque substrate and a metal bump is provided on each electrode of the image sensor chip.

6. An image sensor device according to claim 5, wherein the circuit conductor layer is formed by thick-film printing an electrically conductive paste.

7. An image sensor device according to claim 5, wherein the circuit conductor layer is a flexible printed wiring board.

8. An image sensor device according to claim 1, wherein the image sensor chip is mounted on the optical fiber array plate with transparent photo-curable insulating resin interposed therebetween.

9. An image sensor device according to claim 1, wherein a refractive index $n_0$ of the core of each optical fiber, a refractive index $n_1$ of the clad, a thickness $T$ of the optical fiber array (i.e. the length of each optical fiber), and a width $W_1$ of the optical fiber array satisfy the relationship:

$$W_1/T \leq \tan[\sin^{-1}\{(n_0^2 - n_1^2)^{\frac{1}{2}}/n_0\}]$$

10. An image sensor device according to claim 1, wherein a width $W_0$ of the transparent member satisfies the relationship:

$$0.3 \text{ mm} < W_0 < 0.8 \text{ mm}$$

11. An image sensor device according to claim 2, wherein a refractive index $n_0$ of the core of each optical fiber, a refractive index $n_1$ of the clad, a thickness $T$ of the optical fiber array (i.e. the length of each optical fiber), and the predetermined pitch $P$ of the plurality of first light absorbing layers satisfy the relationship:

$$P/T \leq \tan[\sin^{-1}\{(n_0^2 - n_1^2)^{\frac{1}{2}}/n_0\}]$$

12. A direct-contact type image sensor unit comprising an image sensor device according to claim 1 and a light source disposed above the image sensor chip and leaning toward the second opaque substrate of the image sensor device, wherein the light source irradiates a document original with light through the transparent member and the optical fiber array.

13. A direct-contact type image sensor unit according to claim 12, wherein light emitted from the light source is incident on the document original at an incident angle in the range of 30° to 60°.

14. A direct-contact type image sensor device in which an image sensor chip having electrodes and a photosensitive element array mounted on an optical fiber array plate by a flip-chip-bonding method, wherein
    the optical fiber array plate includes a first opaque substrate, a second opaque substrate, a first optical fiber array formed by arranging a plurality of first optical fibers and a second optical fiber array formed by arranging a plurality of second optical fibers and formed in contact with a side face of the first optical fiber array, the first and second optical fiber arrays being interposed between the first and second opaque substrates, and wherein each of the plurality of first optical fibers includes a center core, a clad provided on an outer surface of the core, and a light absorbing layer provided on an outer surface of the clad, and wherein each of the plurality of second optical fibers includes a center core and a clad provided on an outer surface of the core, and wherein the image sensor chip is positioned in such a way so that the photosensitive element array is disposed along an upper end of the optical fiber array and in a portion of the optical fiber array plate not including the second optical fiber array, whereby the second optical fiber array forms a slit for transmitting light by using one of the first and second opaque substrates as a light shield, so as to reduce variation in width of the slit along a main scanning direction.

15. An image sensor device according to claim 14, wherein a plurality of first light absorbing layers are provided within the first optical fiber array, each of the plurality of first light absorbing layers being provided so as to be in a plane perpendicular to the side face of the first optical fiber array and at a predetermined pitch along a main-scanning direction of the image sensor device.

16. An image sensor device according to claim 14, wherein a second light absorbing layer is provided at an end of the second optical fiber array which comes in contact with a document original.

17. An image sensor device according to claim 14, wherein the image sensor chip is a silicon crystal type IC chip, and wherein the photosensitive element array is a phototransistor array or a photodiode array.

18. An image sensor device according to claim 14, wherein a circuit conductor layer is provided on the first opaque substrate and a metal bump is provided on each electrode of the image sensor chip.

19. An image sensor device according to claim 18, wherein the circuit conductor layer is formed by thick-film printing an electrically conductive paste.

20. An image sensor device according to claim 18, wherein the circuit conductor layer is a flexible printed wiring board.

21. An image sensor device according to claim 14, wherein the image sensor chip is mounted on the optical fiber array plate with transparent photo-curable insulating resin interposed herebetween.

22. An image sensor device according to claim 14, wherein a refractive index $n_0$ of the core of each of the first optical fibers, a refractive index $n_1$ of the clad, a thickness T of the first optical fiber array (i.e. the length of each of the first optical fibers), and a width $W_1$ of the first optical fiber array satisfy the relationship:

$$W_1/T \leq \tan[\sin^{-1}\{(n_0^2 - n_1^2)^{\frac{1}{2}}/n_0\}]$$

23. An image sensor device according to claim 14, wherein a refractive index $n_0$ of the core of each of the second optical fibers, a refractive index $n_1$ of the clad, a thickness T of the second optical fiber array (i.e. the length of each of the second optical fibers), and a width $W_2$ of the second optical fiber array satisfy the relationship:

$$W_2/T \leq \tan[\sin^{-1}\{(n_0^2 - n_1^2)^{\frac{1}{2}}/n_0\}]$$

24. An image sensor device according to claim 15, wherein a refractive index $n_0$ of the core of each of the first optical fibers, a refractive index $n_1$ of the clad, a thickness T of the first optical fiber array (i.e. the length of each of the first optical fibers), and the predetermined pitch P of the plurality of first light absorbing layers satisfy the relationship:

$$P/T \leq \tan[\sin^{-1}\{(n_0^2 - n_1^2)^{\frac{1}{2}}/n_0\}]$$

25. A direct-contact type image sensor unit comprising an image sensor device according to claim 14 and a light source disposed above the image sensor chip and leaning toward the second opaque substrate of the image sensor device, wherein the light source irradiates a document original with light through the second and first optical fiber arrays.

26. A direct-contact type image sensor unit according to claim 25, wherein light emitted from the light source is incident on the document original at an incident angle in the range of 30° to 60°.

27. A direct-contact type image sensor device in which an image sensor chip having electrodes and a photosensitive element array mounted on an optical fiber array plate by a flip-chip-bonding method, wherein the optical fiber array plate includes a first substrate, a second substrate, an optical fiber array formed by arranging a plurality of first optical fibers, and a transparent member disposed in contact with a side face of the optical fiber array, the optical fiber array and the transparent member being interposed between the first and second substrates, and a side-face light absorbing layer is provided at an interface between the optical fiber array and the first substrate and an interface between the transparent member and the second substrate, and wherein each of the plurality of optical fibers includes a center core, a clad provided on an outer surface of the core, and a light absorbing layer provided on an outer surface of the clad, and wherein the image sensor chip is positioned in such a way so that the photosensitive element array is disposed along an upper end of the optical fiber array and in a portion of the optical fiber array plate not including the transparent member, whereby the transparent member forms a slit for transmitting light by using one of the first and second opaque substrates as a light shield, so as to reduce variation in width of the slit along a main scanning direction.

28. An image sensor device according to claim 27, wherein a plurality of first light absorbing layers are provided within the optical fiber array, each of the plurality of first light absorbing layers being provided so as to be in a plane perpendicular to the side face of the optical fiber array and at a predetermined pitch along a main-scanning direction of the image sensor device.

29. An image sensor device according to claim 27, wherein a second light absorbing layer is provided at an end of the transparent member which comes in contact with a document original.

30. An image sensor device according to claim 27, wherein the image sensor chip is a silicon crystal type IC chip, and wherein the photosensitive element array is a phototransistor array or a photodiode array.

31. An image sensor device according to claim 27, wherein a circuit conductor layer is provided on the first substrate and a metal bump is provided on each electrode of the image sensor chip.

32. An image sensor device according to claim 31, wherein the circuit conductor layer is formed by thick-film printing an electrically conductive paste.

33. An image sensor device according to claim 31, wherein the circuit conductor layer is a flexible printed wiring board.

34. A direct-contact type image sensor device according to claim 27, wherein the image sensor chip is mounted on the optical fiber array plate with transparent photo-curable insulating resin interposed therebetween.

35. An image sensor device according to claim 27, wherein a refractive index $n_0$ of the core of each optical fiber, a refractive index $n_1$ of the clad, a thickness T of the optical fiber array (i.e. the length of each optical fiber), and a width $W_1$ of the optical fiber array satisfy the relationship:

$$W_1/T \leq \tan[\sin^{-1}\{(n_0^2-n_1^2)^{\frac{1}{2}}/n_0\}]$$

36. An image sensor device according to claim 27, wherein a width $W_0$ of the transparent member satisfies the relationship:

$$0.3 \text{ mm} < W_0 < 0.8 \text{ mm}$$

37. An image sensor device according to claim 28, wherein a refractive index $n_0$ of the core of each optical fiber, a refractive index $n_1$ of the clad, a thickness T of the optical fiber array (i.e. the length of each optical fiber), and the predetermined pitch P of the plurality of first light absorbing layers satisfy the relationship:

$$P/T \leq \tan[\sin^{-1}\{(n_0^2-n_1^2)^{\frac{1}{2}}/n_0\}]$$

38. A direct-contact type image sensor unit comprising an image sensor device according to claim 27 and a light source disposed above the image sensor chip and leaning toward the second substrate of the image sensor device, wherein the light source irradiates a document original with light through the transparent member and the optical fiber array.

39. A direct-contact type image sensor unit according to claim 38, wherein light emitted from the light source is incident on the document original at an incident angle in the range of 30° to 60°.

40. A direct-contact type image sensor device in which an image sensor chip having electrodes and a photosensitive element array is mounted on an optical fiber array plate by a flip-chip-bonding method, wherein
the optical fiber array plate includes a first substrate, a second substrate, a first optical fiber array formed by arranging a plurality of first optical fibers and a second optical fiber array formed by arranging a plurality of second optical fibers and formed in contact with a side face of the first optical fiber array, the first and second optical fiber arrays being interposed between the first and second substrates, and a side-face light absorbing layer is provided at an interface between the first optical fiber array and the first substrate and an interface between the second optical fiber array and the second substrate, and wherein
each of the plurality of first optical fibers includes a center core, a clad provided on an outer surface of the core, and a light absorbing layer provided on an outer surface of the clad, and wherein
each of the plurality of second optical fibers includes a center core and a clad provided on an outer surface of the core, and wherein
the image sensor chip is positioned in such a way so that the photosensitive element array is disposed along an upper end of the optical fiber array and in a portion of the optical fiber array plate not including the second optical fiber array, whereby the second optical fiber array forms a slit for transmitting light by using one of the first and second opaque substrates as a light shield, so as to reduce variation in width of the slit along a main scanning direction.

41. An image sensor device according to claim 40, wherein a plurality of first light absorbing layers are provided within the first optical fiber array, each of the plurality of first light absorbing layers being provided so as to be in a plane perpendicular to the side face of the first optical fiber array and at a predetermined pitch along a main-scanning direction of the image sensor device.

42. An image sensor device according to claim 40, wherein a second light absorbing layer is provided at an end of the second optical fiber array which comes in contact with a document original.

43. An image sensor device according to claim 40, wherein the image sensor chip is a silicon crystal type IC chip, and wherein the photosensitive element array is a phototransistor array or a photodiode array.

44. An image sensor device according to claim 40, wherein a circuit conductor layer is provided on the first substrate and a metal bump is provided on each electrode of the image sensor chip.

45. An image sensor device according to claim 44, wherein the circuit conductor layer is formed by thick-film printing an electrically conductive paste.

46. An image sensor device according to claim 44, wherein the circuit conductor layer is a flexible printed wiring board.

47. An image sensor device according to claim 40, wherein the image sensor chip is mounted on the optical fiber array plate with transparent photo-curable insulating resin interposed therebetween.

48. An image sensor device according to claim 40, wherein a refractive index $n_0$ of the core of each of the first optical fibers, a refractive index $n_1$ of the clad, a thickness T of the first optical fiber array (i.e. the length of each of the first optical fibers), and a width $W_1$ of the first optical fiber array satisfy the relationship:

$$W_1/T \leq \tan[\sin^{-1}\{(n_0^2-n_1^2)^{\frac{1}{2}}/n_0\}]$$

49. An image sensor device according to claim 40, wherein a refractive index $n_0$ of the core of each of the second optical fibers, a refractive index $n_1$ of the clad, a thickness T of the second optical fiber array (i.e. the length of each of the second optical fibers), and a width $W_2$ of the second optical fiber array satisfy the relationship:

$$W_2/T \leq \tan[\sin^{-1}\{(n_0^2-n_1^2)^{\frac{1}{2}}/n_0\}]$$

50. An image Sensor device according to claim 41, wherein a refractive index $n_0$ of the core of each of the first optical fibers, a refractive index $n_1$ of the clad, a thickness T of the first optical fiber array (i.e. the length of each of the first optical fibers), and the predetermined pitch P of the plurality of first light absorbing layers satisfy the relationship:

$$P/T \leq \tan[\sin^{-1}\{(n_0^2 - n_1^2)^{\frac{1}{2}}/n_0\}]$$

51. A direct-contact type image sensor unit comprising an image sensor device according to claim 40 and a light source disposed above the image sensor chip and leaning toward the second substrate of the image sensor device, wherein the light source irradiates a document original with light through the second and first optical fiber arrays.

52. A direct-contact type image sensor unit according to claim 51, wherein light emitted from the light source is incident on the document original at an incident angle in the range of 30° to 60°.

* * * * *